United States Patent
Narathong et al.

(10) Patent No.: US 9,525,503 B2
(45) Date of Patent: Dec. 20, 2016

(54) RECONFIGURABLE MULTI-MODE TRANSCEIVER

(71) Applicant: QUALCOMM Incorporated, San Diego, CA (US)

(72) Inventors: Chiewcharn Narathong, Laguna Niguel, CA (US); Lai Kan Leung, San Marcos, CA (US); Dongling Pan, San Diego, CA (US); Rajagopalan Rangarajan, San Diego, CA (US); Kevin Hsi-huai Wang, San Diego, CA (US); Bhushan Shanti Asuri, San Diego, CA (US); Yiwu Tang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 170 days.

(21) Appl. No.: 14/513,003

(22) Filed: Oct. 13, 2014

(65) Prior Publication Data
US 2015/0349907 A1 Dec. 3, 2015

Related U.S. Application Data

(60) Provisional application No. 62/004,011, filed on May 28, 2014.

(51) Int. Cl.
*H04J 3/00* (2006.01)
*H04J 4/00* (2006.01)
(Continued)

(52) U.S. Cl.
CPC ............... *H04J 4/00* (2013.01); *H04B 1/0082* (2013.01); *H04B 1/3833* (2013.01); *H04B 1/403* (2013.01);
(Continued)

(58) Field of Classification Search
CPC ..................... H04M 3/42042; H04M 3/42051; H04M 3/42059; H04M 3/42068; H04M 1/2535; H04M 7/006
See application file for complete search history.

(56) References Cited

U.S. PATENT DOCUMENTS 5,475,677 A * 12/1995 Arnold ................... H04B 1/005
370/280
7,684,763 B2   3/2010 Boos
(Continued)

FOREIGN PATENT DOCUMENTS

WO   2014204706 A2   12/2014

OTHER PUBLICATIONS

International Search Report and Written Opinion—PCT/US2015/029067—ISA/EPO Aug. 17, 2015.

*Primary Examiner* — Alvin Zhu
(74) *Attorney, Agent, or Firm* — Procopio, Cory, Hargreaves & Savitch LLP

(57) ABSTRACT

Reconfiguring a transceiver design using a plurality of frequency synthesizers and a plurality of carrier aggregation (CA) receiver (Rx) and transmitter (Tx) chains, the method including: connecting a first frequency synthesizer to a first CA Tx chain; connecting the plurality of frequency synthesizers to the plurality of CA Rx chains, wherein a second frequency synthesizer of the plurality of frequency synthesizers is connected as a shared synthesizer to a first CA Rx chain and a second CA Tx chain.

18 Claims, 17 Drawing Sheets

(51) Int. Cl.
*H04W 88/02* (2009.01)
*H04B 1/3827* (2015.01)
*H04L 5/14* (2006.01)
*H04B 1/00* (2006.01)
*H04B 1/403* (2015.01)
*H04L 5/00* (2006.01)
*H04B 1/50* (2006.01)
*H04B 1/54* (2006.01)

(52) U.S. Cl.
CPC ............... *H04L 5/001* (2013.01); *H04L 5/14* (2013.01); *H04W 88/02* (2013.01); *H04B 1/50* (2013.01); *H04B 1/54* (2013.01)

(56) References Cited

U.S. PATENT DOCUMENTS

| | | |
|---|---|---|
| 7,792,510 B2 | 9/2010 | Pestryakov et al. |
| 2009/0156135 A1 | 6/2009 | Kamizuma et al. |
| 2010/0048196 A1 | 2/2010 | Georgantas et al. |
| 2012/0140682 A1 | 6/2012 | Reed et al. |
| 2012/0230228 A1* | 9/2012 | Oka .................... H04B 1/0057 370/277 |
| 2013/0315348 A1 | 11/2013 | Tasic et al. |
| 2014/0134961 A1 | 5/2014 | Morris |
| 2014/0146761 A1 | 5/2014 | Li et al. |
| 2014/0355526 A1* | 12/2014 | Kahrizi ................ H04L 5/00 370/329 |
| 2015/0180523 A1* | 6/2015 | Tasic ................... H04B 1/26 375/316 |
| 2015/0181643 A1* | 6/2015 | Lakdawala ............ H04B 7/06 375/299 |
| 2015/0333815 A1* | 11/2015 | Leung ................ H04B 7/0897 455/208 |

* cited by examiner

US 9,525,503 B2

RECONFIGURABLE MULTI-MODE TRANSCEIVER

CROSS-REFERENCE TO RELATED APPLICATIONS

This application claims the benefit of priority under 35 U.S.C. §119(e) of co-pending U.S. Provisional Patent Application No. 62/004,011, filed May 28, 2014, entitled "Reconfigurable Multi-mode FDD/TDD Transceiver." The disclosure of the above-referenced application is incorporated herein by reference.

BACKGROUND

Field

This invention relates generally to transceivers, and more specifically, to a reconfigurable multi-mode transceiver.

Background

A transceiver in a communication system may transmit data using a transmitter and receive data using a receiver for two-way communication. The transceiver may also support carrier aggregation (CA), which is simultaneous operation on multiple carriers. Multi-mode transceivers including Long Term Evolution (LTE)/Frequency Division Duplex (FDD). LTE/Time Division Duplex (TDD). Circuit-Switched FallBack (CSFB), Simultaneous Voice and LTE (SVLTE), Simultaneous GSM and LTE (SGLTE), Dual SIM Dual Standby (DSDS), and other similarly-configured devices co-exist in several different combinations in different regions of the world. Further, LTE carrier aggregation with 2, 3, and 4 downlinks is already out or will soon be available. Thus, a device that can handle multiple modes and bands while providing seamless FDD and TDD interoperability is needed in order to meet the growing demands for wireless data. However, the support of both FDD and TDD operations complicates the local oscillator LO and synthesizer connections to the receive (RX) and transmit (TX) links in the multi-mode transceiver.

To address the issues connected with a need for multi-band, multi-mode devices, a two-chip configuration in which one transceiver (e.g., an FDD transceiver) resides on a first chip and another transceiver (e.g., a TDD transceiver supporting LTE-CA and other technologies) resides on a second chip can be used. Although this configuration may provide the needed features, it will occupy more chip area, consume more current, and support less number of combinations of CA than a single-chip solution. Accordingly, a need exists for reconfiguring and reusing the transceiver flexibly with minimum hardware to provide a single-chip solution for improving the FDD and TDD interoperability and better spectrum utilization.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As described above, supporting both FDD and TDD operations complicates the LO and synthesizer connection to the receive (RX) and transmit (TX) links in the multi-mode transceiver.

Embodiments as described herein provide for flexibly reconfiguring and reusing the transceiver with minimum hardware to provide a single-chip solution for improving the Frequency Division Duplex (FDD) and Time Division Duplex (TDD) interoperability and better spectrum utilization. After reading this description it will become apparent how to implement the invention in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1A:
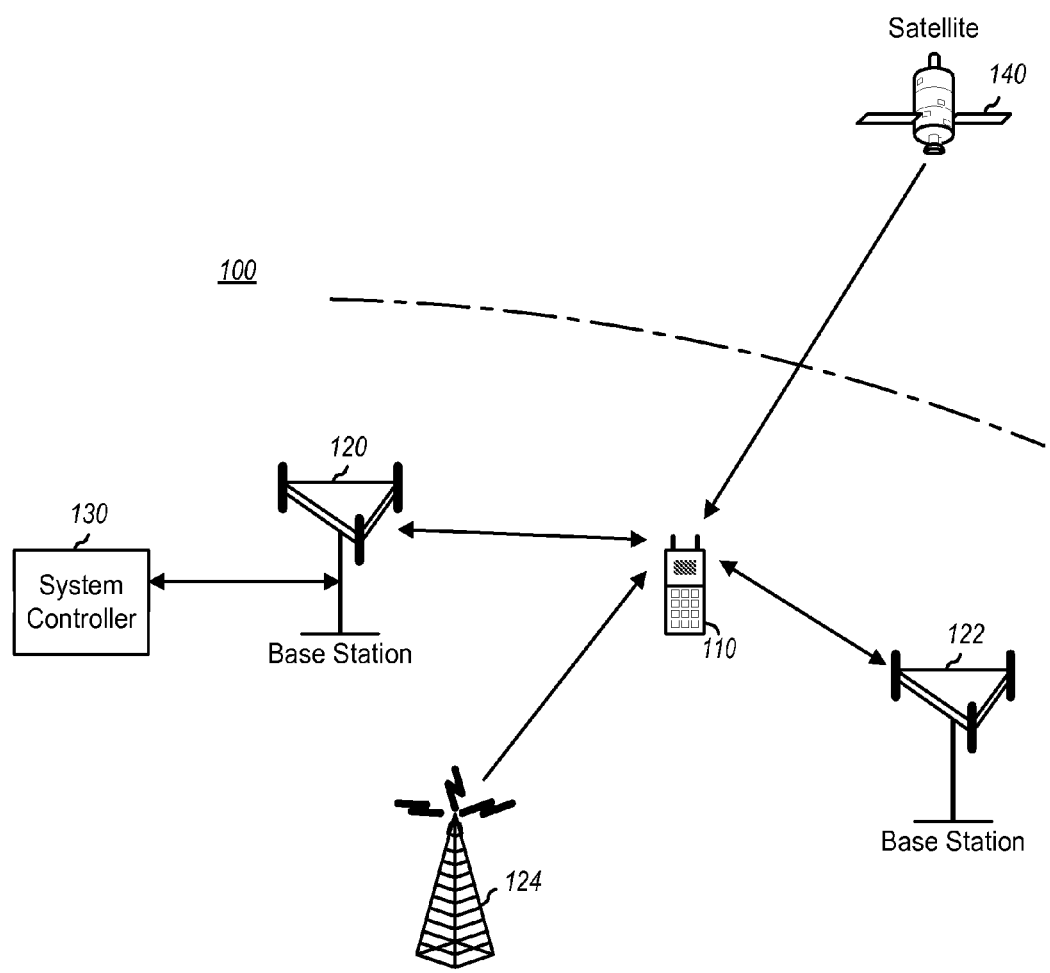
FIG. 1A is a wireless device communicating with a wireless communication system.

FIG. 1A is a wireless device 110 communicating with a wireless communication system 100. Wireless system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1A shows wireless system 100 including two base stations 120 and 122 and one system controller 130. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 100. Wireless device 110 may also receive signals from broadcast stations (e.g., a broadcast station 124), signals from satellites (e.g., a satellite 140) in one or more global navigation satellite systems (GNSS), etc. Wireless device 110 may support one or more radio technologies for wireless communication such as LTE, WCDMA, CDMA 1x, EVDO, TD-SCDMA, GSM, 802.11, etc.

Wireless device 110 may be able to operate in low-band (LB) covering frequencies lower than 1000 megahertz (MHz), mid-band (MB) covering frequencies from 1000 MHz to 2300 MHz, and/or high-band (HB) covering frequencies higher than 2300 MHz. For example, low-band may cover 698 to 960 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). Each band may cover up to 200 MHz. LTE Release 11 supports 35 bands, which are referred to as LTE/UMTS bands and are listed in a publicly available document 3GPP TS 36.101. In general, any number of band groups may be defined. Each band group may cover any range of frequencies, which may or may not match any of the frequency ranges given above. Each band group may include any number of bands.

Wireless device 110 may support carrier aggregation, which is operation on multiple carriers with multiple downlinks (DL) and multiple uplinks (UL)) for LTE-advanced technology in FDD and TDD modes. Thus, carrier aggregation may also be referred to as multi-carrier operation. A carrier may refer to a range of frequencies used for communication and may be associated with certain characteristics. For example, a carrier may be associated with system information and/or control information describing operation on the carrier. A carrier may also be referred to as a component carrier (CC), a frequency channel, a cell, etc. A band may include one or more carriers. Each carrier may cover up to 20 MHz in LTE. Wireless device 110 may be configured with up to 5 carriers in one or two bands.

Wireless device 110 may receive multiple transmitted signals sent concurrently at different frequencies. These multiple transmitted signals may be sent by (i) one or more base stations on multiple carriers at different frequencies for carrier aggregation, or (ii) different base stations in the same wireless system for coordinated multi-point (CoMP), or (iii) one or more base stations in one or more wireless systems for concurrent services (e.g., concurrent voice/voice, voice/data, data/data, etc.), or (iv) one or more base stations for concurrent transmissions.

Figure 1B:
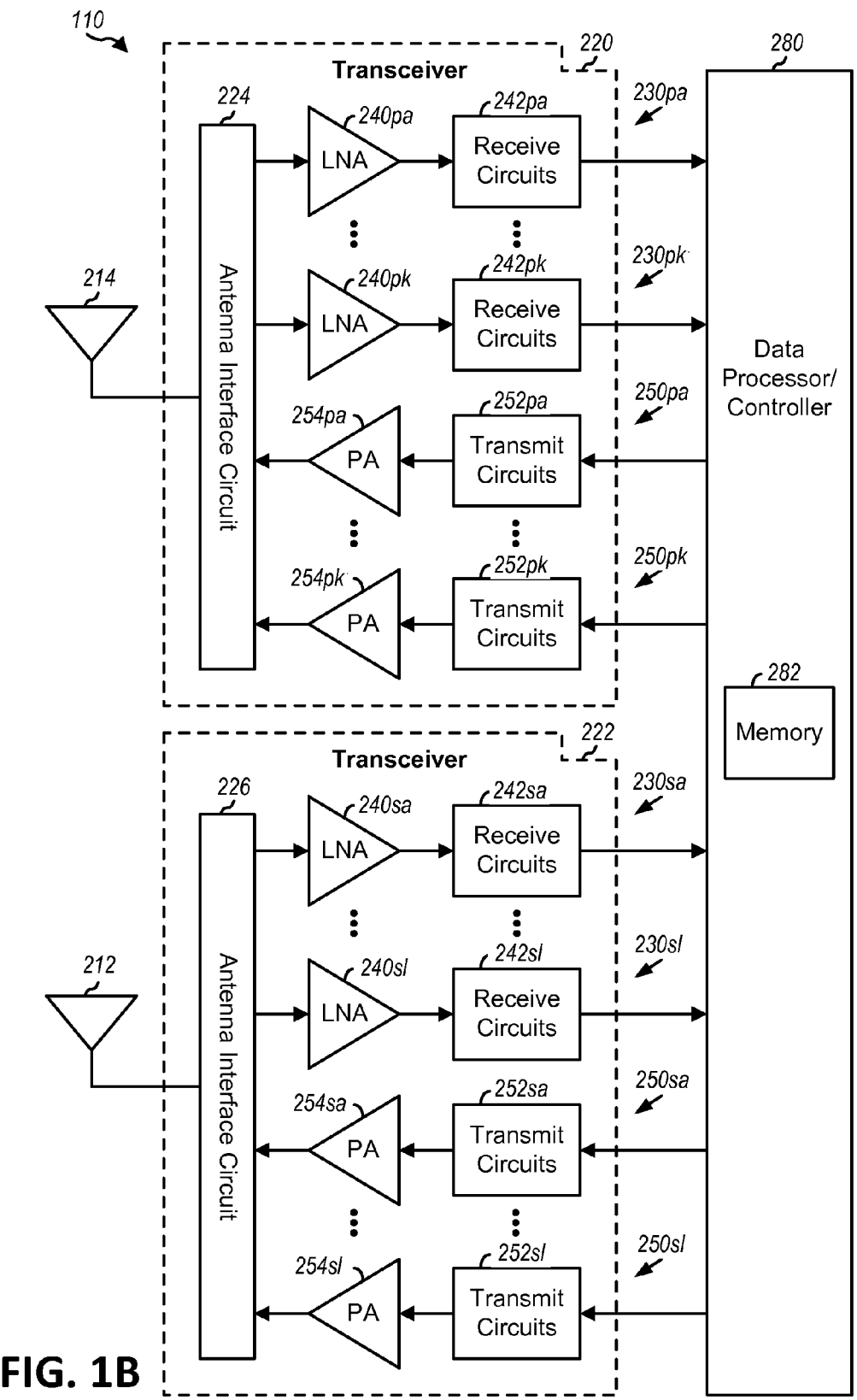
FIG. 1B is a block diagram of an exemplary design of the wireless device shown in FIG. 1A.

FIG. 1B is a block diagram of an exemplary design of wireless device 110 shown in FIG. 1A. In this exemplary design, wireless device 110 includes a transceiver 220 coupled to a primary antenna 214, a transceiver 222 coupled to a secondary antenna 212, and a data processor/controller 280. Transceiver 220 includes multiple (k) receivers 230$pa$ to 230$pk$ and multiple (k) transmitters 250$pa$ to 250$pk$ to support multiple frequency bands, multiple radio technologies, carrier aggregation, etc. Transceiver 222 includes multiple (l) receivers 230$sa$ to 230$sl$ and multiple (l) transmitters 250$sa$ to 250$sl$ to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 1B, each receiver 230 includes an LNA 240 and receive circuits 242. For data reception, antenna 214 receives signals from base stations and/or other transmitter stations and provides a received RF signal, which is routed through an antenna interface circuit 224 and presented as an input RF signal to a selected receiver. Antenna interface circuit 224 may include switches, duplexers, transmit filters, receive filters, matching circuits, etc. The description below assumes that receiver 230$pa$ is the selected receiver. Within receiver 230$pa$, an LNA 240$pa$ amplifies the input RF signal and provides an output RF signal. Receive circuits 242$pa$ downconvert the output RF signal from RF to baseband, amplify and filter the downconverted signal, and provide an analog input signal to data processor 280. Receive circuits 242$pa$ may include mixers, filters, amplifiers, matching circuits, an oscillator, a local oscillator (LO) generator, a phase locked loop (PLL), etc. Each remaining receiver 230 in transceivers 220 and 222 may operate in similar manner as receiver 230$pa$.

In the exemplary design shown in FIG. 1B, each transmitter 250 includes transmit circuits 252 and a power amplifier (PA) 254. For data transmission, data processor 280 processes (e.g., encodes and modulates) data to be transmitted and provides an analog output signal to a selected transmitter. The description below assumes that transmitter 250$pa$ is the selected transmitter. Within transmitter 250$pa$, transmit circuits 252$pa$ amplify, filter, and upconvert the analog output signal from baseband to RF and provide a modulated RF signal. Transmit circuits 252$pa$ may include amplifiers, filters, mixers, matching circuits, an oscillator, an LO generator, a PLL, etc. A PA 254$pa$ receives and amplifies the modulated RF signal and provides a transmit RF signal having the proper output power level. The transmit RF signal is routed through antenna interface circuit 224 and transmitted via antenna 214. Each remaining transmitter 250 in transceivers 220 and 222 may operate in similar manner as transmitter 250$pa$.

FIG. 1B also shows an exemplary design of receiver 230 and transmitter 250. A receiver and a transmitter may also include other circuits not shown in FIG. 1B, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 within transceivers 220 and 222 may be implemented on multiple IC chips. The circuits in transceivers 220 and 222 may also be implemented in other manners.

Data processor/controller 280 may perform various functions for wireless device 110. For example, data processor 280 may perform processing for data being received via receivers 230 and data being transmitted via transmitters 250. Controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Carrier aggregation (CA) may include primary serving cell (Pcell) and one or more secondary serving cells (SCells). The receive (Rx) and transmit (Tx) frequencies are paired in PCell. In some embodiments such as in the case with a single uplink, the receive (Rx) and transmit (Tx) frequencies can be paired in PCell. In other embodiments, if carrier aggregation is enabled in the uplinks, it is possible that the other uplink is transmitted at the other Tx frequencies in the Scells. In a specified band combination, the first cell specified is usually PCell. For example, in band combination B42+B17+B4+B2, B42 is PCell and B17, B4, and B2 are SCells. In one embodiment, reconfiguring the transceiver to provide a single-chip solution for improving the FDD and TDD interoperability involves appropriately mixing synthesizers in receiver and transmitter links/chains of the CA modes. For example, one CA synthesizer (CA0) can be shared alternatively between the receiver chain and the transmitter chain when this CA synthesizer (CA0) is assigned to a TDD band. Otherwise, in FDD mode, CA synthesizer (CA0) is used separately for the receiver chain or the transmitter chain by disabling one or the other chain. Simultaneously, other CA synthesizers (CA1/2/3) or TX synthesizer can be configured to provide the LO signals separately to the receiver chain or the transmitter chain. This configuration provides added benefits. For example, for the FDD portion, a separated synthesizer approach allows: good isolation between the receive signal path and the transmit signal path to avoid the receiver desensitization; and good isolation between the receive voltage-controlled oscillator (VCO) and the transmit VCO to avoid VCO pulling, which may result in integrated phase noise (IPN) degradation. For the TDD portion, a simultaneously shared synthesizer approach allows short transmitter/receiver LO connections to the shared synthesizer to reduce the current consumption.

Table 1 shows several different example configurations to demonstrate the flexibility of the reconfigurable FDD/TDD transceiver design using multiple technologies. For example, in mixed LTE FDD/TDD configurations such as Configurations 1-2, driving the TDD Rx and Tx (CA0) chains with the shared synthesizer (CA0) and the FDD Rx or Tx chain with a separate synthesizer can achieve the best hardware utilization by maximizing the number of downlinks to 4 and uplinks to 2 with only 5 synthesizers in this example. Similar configurations can be used to include non-LTE technologies. For example, Configurations 5-7 (assuming GSM as TDD and CDMA as FDD) use the shared synthesizer (CA0) to drive the GSM or LTE in TDD mode and the other separate synthesizers are used to drive the other LTE or CDMA technologies in FDD mode. For Configurations 3 and 4, which include only FDD technology, the shared synthesizer (CA0) can be used as a FDD synthesizer for the Rx chain or the Tx chain.

TABLE 1

| Config. No. | Technology | Mode | CA1 Synth | CA2 Synth | CA3 Synth | CA0 Synth | TX Synth |
|---|---|---|---|---|---|---|---|
| 1 | LTE FDD/ CA + LTE TDD/CA | 4DL + 2UL | RX | RX | RX | RX + TX | TX |
| 2 | LTE TDD/ CA + LTE TDD/CA | 4DL + 2UL | RX | RX | RX | RX + TX | TX |

TABLE 1-continued

| Config. No. | Technology | Mode | CA1 Synth | CA2 Synth | CA3 Synth | CA0 Synth | TX Synth |
|---|---|---|---|---|---|---|---|
| 3 | LTE FDD/CA | 4DL + 1UL | RX | RX | RX | RX | TX |
| 4 | LTE FDD/CA | 3DL + 2UL | RX | RX | RX | TX | TX |
| 5 | SGLTE/CA | 3DL + 1UL + GSM | RX | RX | RX | RX + TX | TX |
| 6 | SVLTE/CA | 3DL + 1UL + CDMA | RX | RX | RX | RX + TX | TX |
| 7 | SVLTE/ CA + DSDS | 2DL + 2UL + CDMA | RX | RX | RX | RX + TX | TX |

Figure 1C:
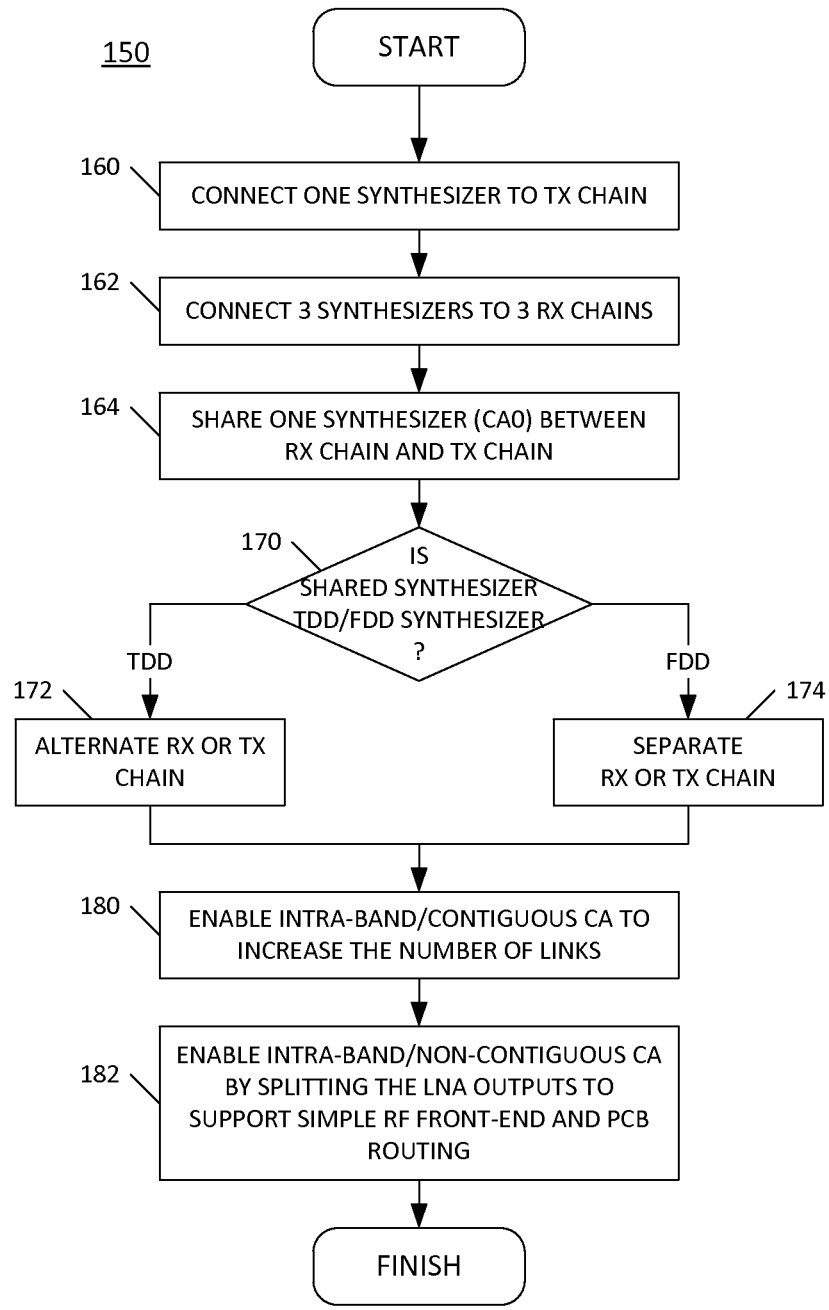
FIG. 1C is a flow diagram illustrating a method for reconfiguring a transceiver design to maximize the number of downlinks (DLs) and uplinks (ULs) using a fixed number of synthesizers in accordance with one embodiment of the present disclosure.

FIG. 1C is a flow diagram 150 illustrating a method for reconfiguring a transceiver design to maximize the number of downlinks (DLs) and uplinks (ULs) using a fixed number of synthesizers in accordance with one embodiment of the present disclosure. In one embodiment, a maximum of four downlinks and two uplinks (inter-band CA) are configured with five synthesizers, four receiver chains, and two transmitter chains. One frequency synthesizer is connected, at step 160, to one transmitter chain, and three synthesizers are connected, at step 162, to three receiver chains. A frequency synthesizer (e.g., CA0) is then configured, at step 164, to be shared between a receiver chain and a transmitter chain. At step 170, a determination is made as to whether the shared synthesizer is to drive TDD or FDD chain(s). If the shared synthesizer is to drive TDD chains, the shared synthesizer is assigned to be shared alternatively between the Rx chain and the Tx chain. Otherwise, if the shared synthesizer is to drive the FDD chain, the shared synthesizer is configured to be used separately for the Rx chain or the Tx chain by disabling one or the other chain, depending on the technology of the FDD chain. Thus, the number of links is increased by sharing the synthesizer between the Rx chain and the Tx chain, which are assigned to TDD.

The number of links can be increased further by enabling intra-band/contiguous carrier aggregation, at step 180. For example, for intra-band/contiguous CA, one downlink can be enabled to use the same synthesizer frequency with extended receive baseband filter (BBF) bandwidth to receive two downlink channels. Similarly, one uplink can be enabled to use the same synthesizer frequency with extended transmit baseband filter (BBF) bandwidth to transmit on two uplink channels. At step 182, intra/non-contiguous CA may be enabled by splitting the LNA output to support simple RF front-end and less complicated PCB routing.

The method of FIG. 1C can be generalized as reconfiguring a transceiver design to maximize a number of links using a plurality of frequency synthesizers and a plurality of carrier aggregation (CA) receiver (Rx) and transmitter (Tx) chains including: connecting a first frequency synthesizer to a first CA Tx chain; connecting the plurality of frequency synthesizers to the plurality of CA Rx chains, wherein a second frequency synthesizer of the plurality of frequency synthesizers is configured as a shared synthesizer shared between a first CA Rx chain and a second CA Tx chain, when the shared synthesizer is to drive TDD chains. In one embodiment, the shared synthesizer is configured to be used separately for the second CA Tx chain or the first CA Rx chain when the shared synthesizer is to drive an FDD chain. In another embodiment, intra-band/contiguous CA in the downlink is enabled to use same synthesizer frequency with extended baseband filter (BBF) bandwidth to receive two extra downlink channels. In another embodiment, intra-band/contiguous CA in the uplink is enabled to use same synthesizer frequency with extended baseband filter (BBF) bandwidth to receive two extra uplink channels. In a further embodiment, intra-band/non-contiguous CA may be enabled by splitting LNA outputs.

Figure 2A:
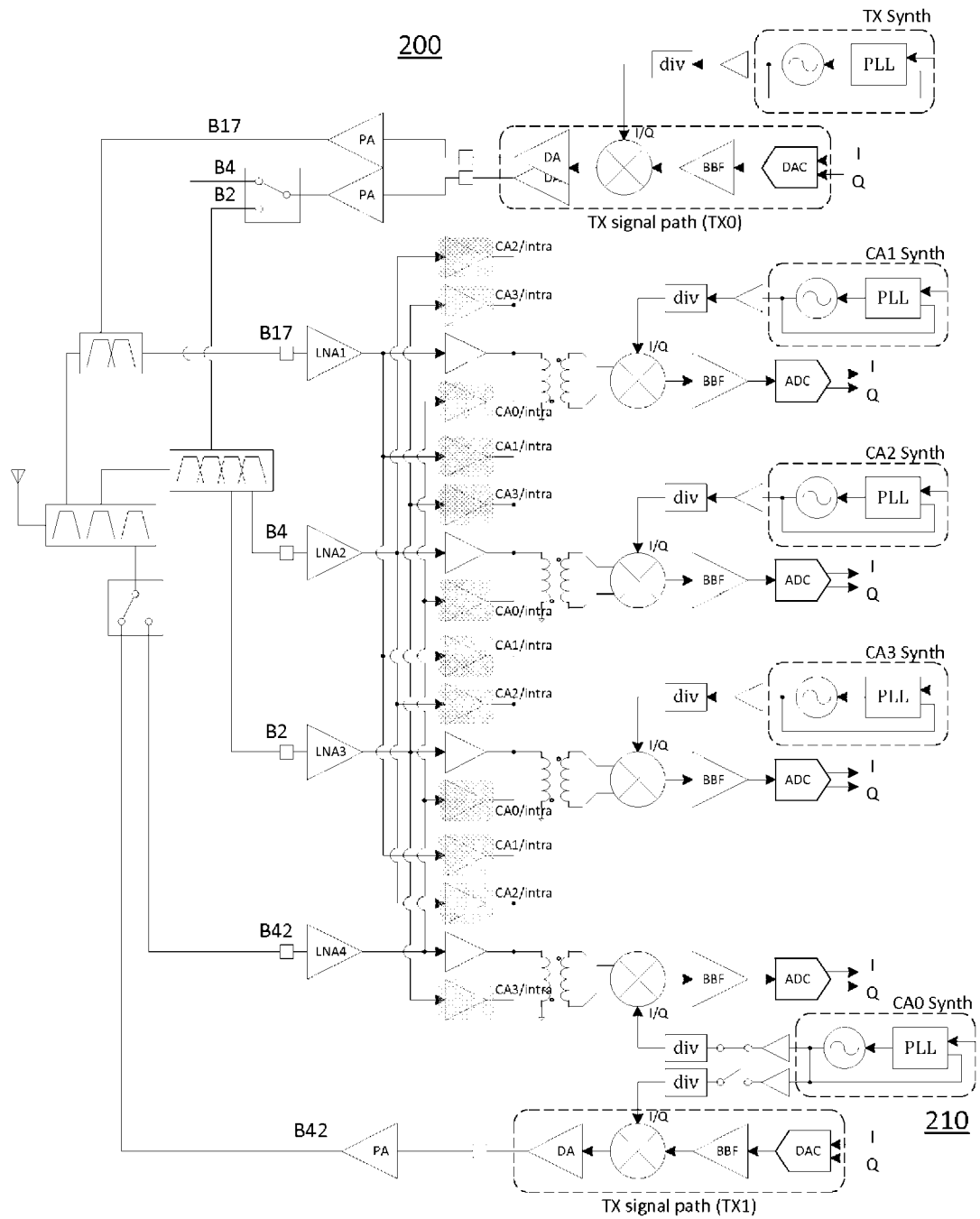
FIG. 2A illustrates one example case (LTE FDD(3DL+1UL)+LTE TDD(1DL+1UL)) of an FDD/TDD CA transceiver designed using the method described in FIG. 1C.

FIG. 2A illustrates one example case (LTE FDD(3DL+1UL)+LTE TDD(1DL+1UL)) of an FDD/TDD CA transceiver 200 designed using the method described in FIG. 1C. Table 2 specifies the layout of the Rx and Tx chains for band combination B42+B17+B4+B2 shown in FIG. 2A. Thus, LTE TDD band 42 is assigned to Rx/CA0 and TX1 so that CA0 synthesizer 210 can be shared. The remaining chains (Rx/CA1, Rx/CA2, Rx/CA3, Tx0) are assigned to LTE FDD bands 17, 4 and 2. Since there are no intra-band links, all CA/intra buffers are disabled (shaded areas in FIG. 2A).

TABLE 2

| R/T | Technology | Band |
|---|---|---|
| RX/CA1 | LTE FDD | B17 |
| RX/CA2 | LTE FDD | B4 |
| RX/CA3 | LTE FDD | B2 |
| RX/CA0 | LTE TDD | B42 |
| TX0 | LTE FDD | B17 |
| TX1 | LTE TDD | B42 |

Figure 2B:
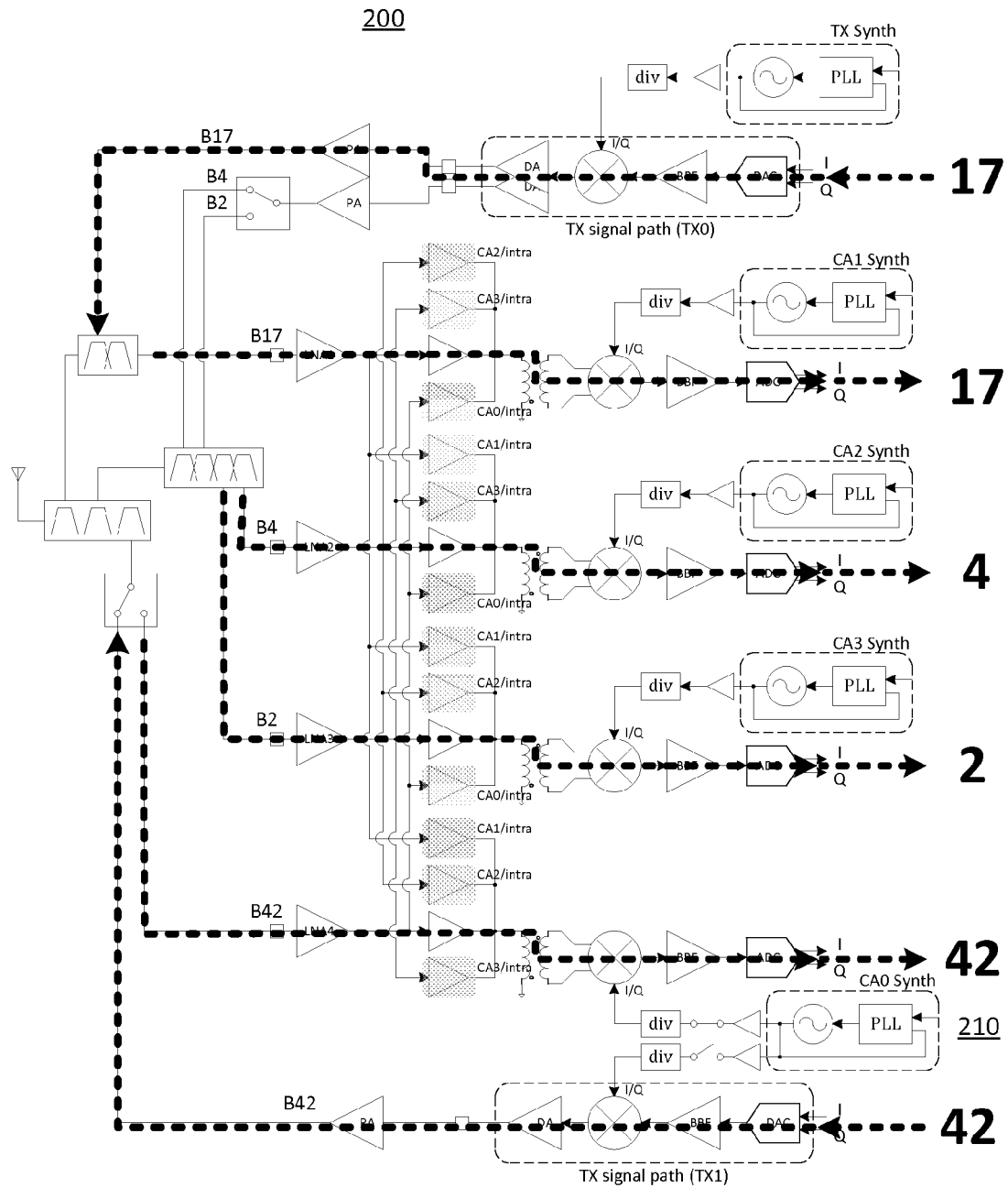
FIG. 2B illustrates signal paths for the Rx and Tx chains of an FDD/TDD CA transceiver shown in FIG. 2A.

FIG. 2B illustrates signal paths for the Rx and Tx chains of an FDD/TDD CA transceiver 200 shown in FIG. 2A. The top most chain is a TX chain for band 17 assigned to LTE FDD. The next chain down is an RX chain for band 17 assigned to LTE FDD. The next chain down is an RX chain for band 4 assigned to LTE FDD. The next chain down is an RX chain for band 2 assigned to LTE FDD. The next two chains are an RX chain and a TX chain for band 42 which are sharing CA0 synthesizer 210 and are assigned to LTE TDD.

Figure 3A:
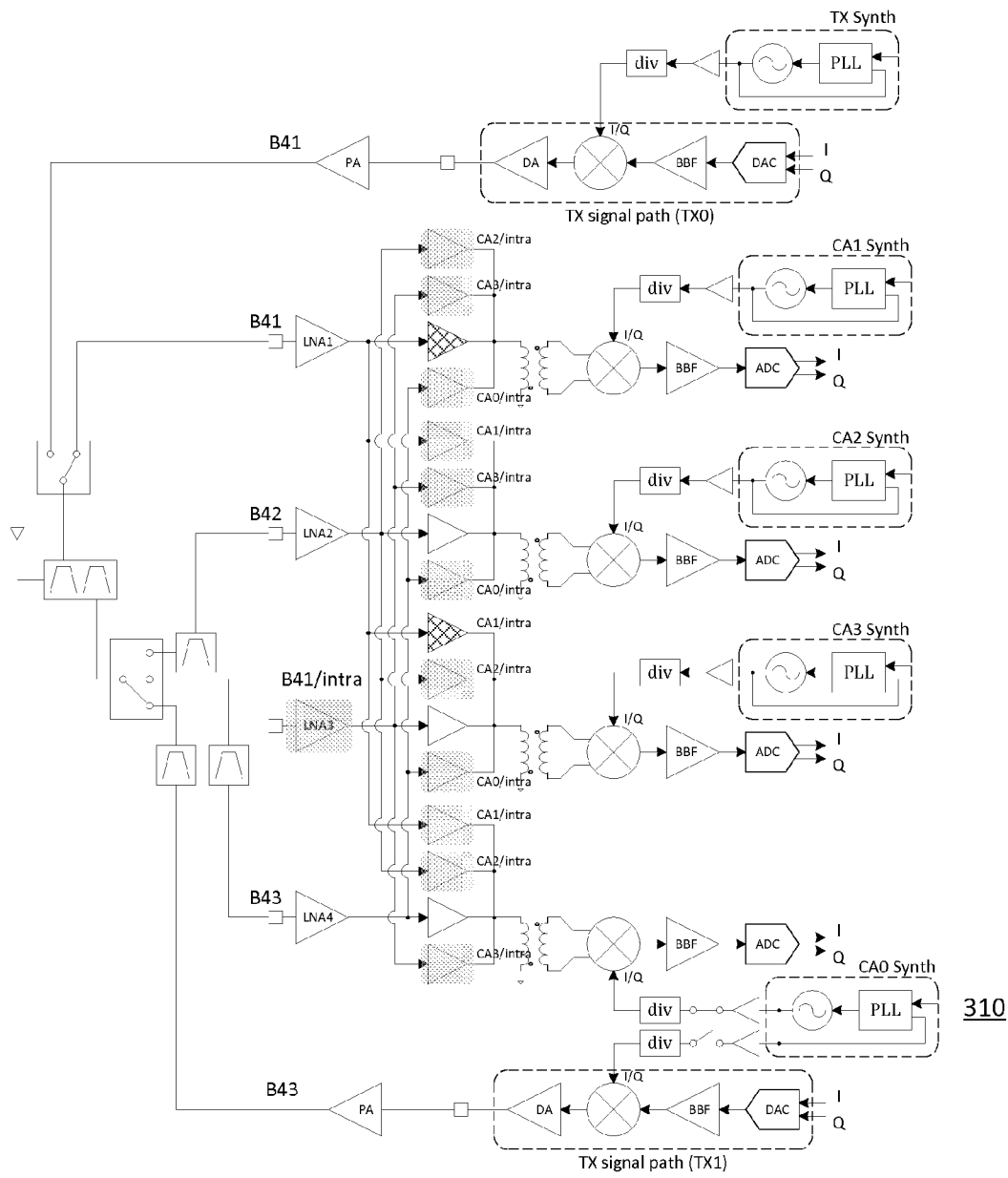
FIG. 3A illustrates another example case (LTE TDD(2DL/intra/non-contiguous+1UL+2DL/inter+1UL)) of a TDD CA transceiver designed using the method described in FIG. 1C.

FIG. 3A illustrates another example case (LTE TDD(2DL/intra/non-contiguous+1UL+2DL/inter+1UL)) of a TDD CA transceiver 300 designed using the method described in FIG. 1C. Table 3 specifies the layout of the Rx and Tx chains for band combination B43+B41+B42+B41/intra shown in FIG. 3A. Thus, LTE TDD band 43 is assigned to Rx/CA0 and TX1 so that CA0 synthesizer 310 can be shared. The remaining chains (Rx/CA1, Rx/CA2, Rx/CA3, Tx0) are all assigned to LTE TDD bands 41 and 42. Since intra/non-contiguous CA is enabled in band 41, LNA3 for B41/intra is disabled (shaded) and LNA1 output of B41 is split out into two buffers (cross patterned) to share the output of LNA1 between Rx/CA1 and Rx/CA3.

TABLE 3

| R/T | Technology | Band |
|---|---|---|
| RX/CA1 | LTE TDD | B41 |
| RX/CA2 | LTE TDD | B42 |
| RX/CA3 | LTE TDD | B41/intra |
| RX/CA0 | LTE TDD | B43 |
| TX0 | LTE TDD | B41 |
| TX1 | LTE TDD | B43 |

Figure 3B:
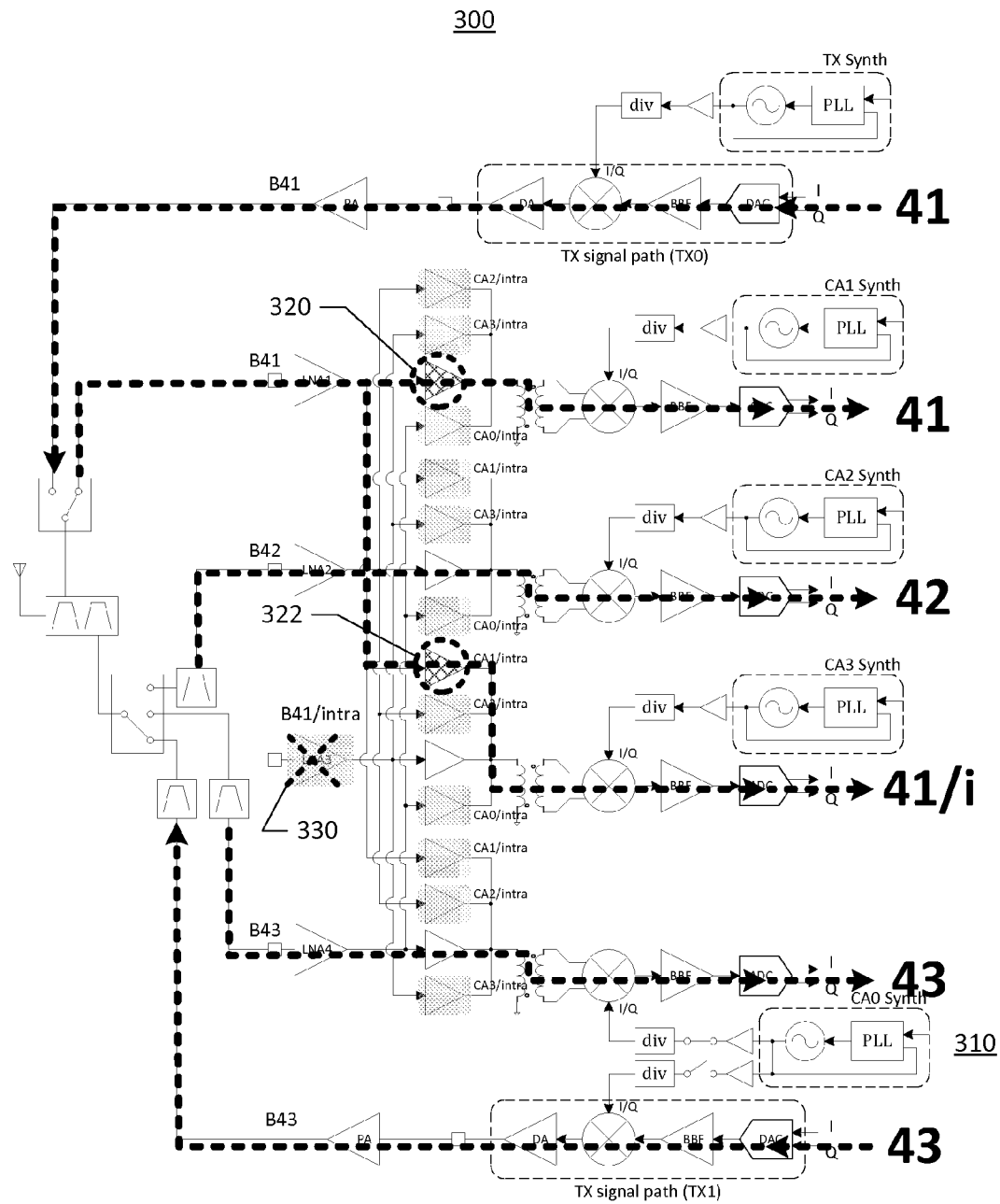
FIG. 3B illustrates signal paths for the Rx and Tx chains of a TDD CA transceiver shown in FIG. 3A.

FIG. 3B illustrates signal paths for the Rx and Tx chains of a TDD CA transceiver 300 shown in FIG. 3A. The top most chain is a TX chain for band 41 assigned to LTE TDD. The next chain down is an RX chain for band 41 assigned to LTE TDD. The next chain down is an RX chain for band 42 assigned to LTE TDD. The next chain down is an RX chain for band 41/intra. Since intra/non-contiguous CA is enabled, LNA3 for B41/intra is disabled (shaded) 330 and LNA output of B41 is split out into two buffers (cross patterned) 320, 322 to share the output of LNA1 for RX chains of band 41 and band 41/intra. The next two chains are an RX chain and a TX chain for band 43 which are sharing CA0 synthesizer 310.

Figure 4A:
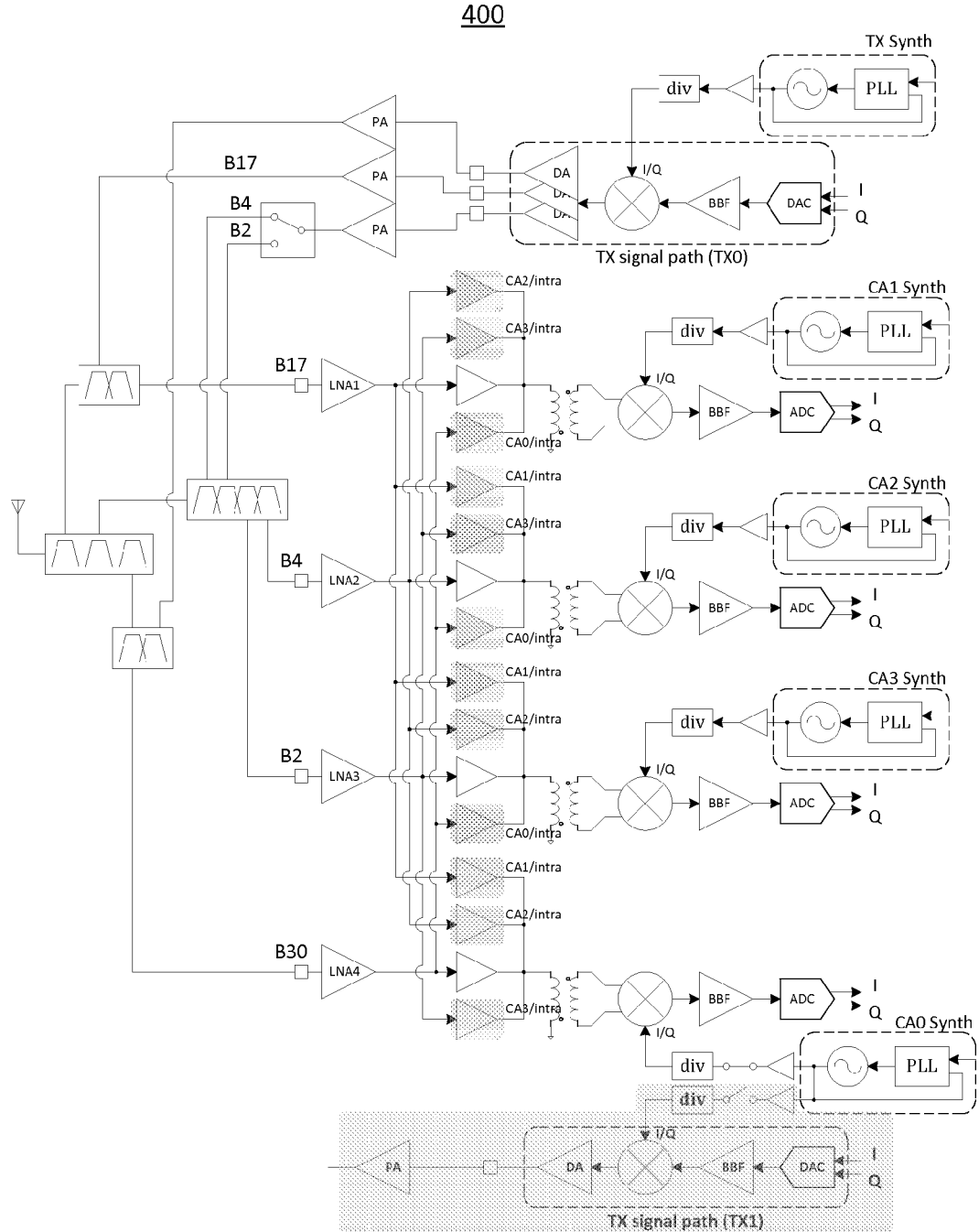
FIG. 4A illustrates another example case (LTE FDD (4DL+1UL)) of an FDD CA transceiver designed using the method described in FIG. 1C.

FIG. 4A illustrates another example case (LTE FDD (4DL+1UL)) of an FDD CA transceiver designed using the method described in FIG. 1C. Table 4 specifies the layout of the Rx and Tx chains for band combination B30+B17+B4+B2 shown in FIG. 4A. FDD band 30 is assigned to Rx/CA0 only so that CA0 synthesizer is separately used by Rx/CA0. TX1 chain is disabled because CA0 synthesizer is assigned to a Rx chain in LTE FDD. The remaining chains (Rx/CA1, Rx/CA2, Rx/CA3, TX0) are also assigned to LTE FDD bands 17, 4 and 2. Since there are no intra-band links, all CA/intra buffers are disabled (shaded areas in FIG. 4A).

TABLE 4

| R/T | Technology | Band |
|---|---|---|
| RX/CA1 | LTE FDD | B17 |
| RX/CA2 | LTE FDD | B4 |
| RX/CA3 | LTE FDD | B2 |
| RX/CA0 | LTE FDD | B30 |
| TX0 | LTE FDD | B17 |
| TX1 | NA | NA |

Figure 4B:
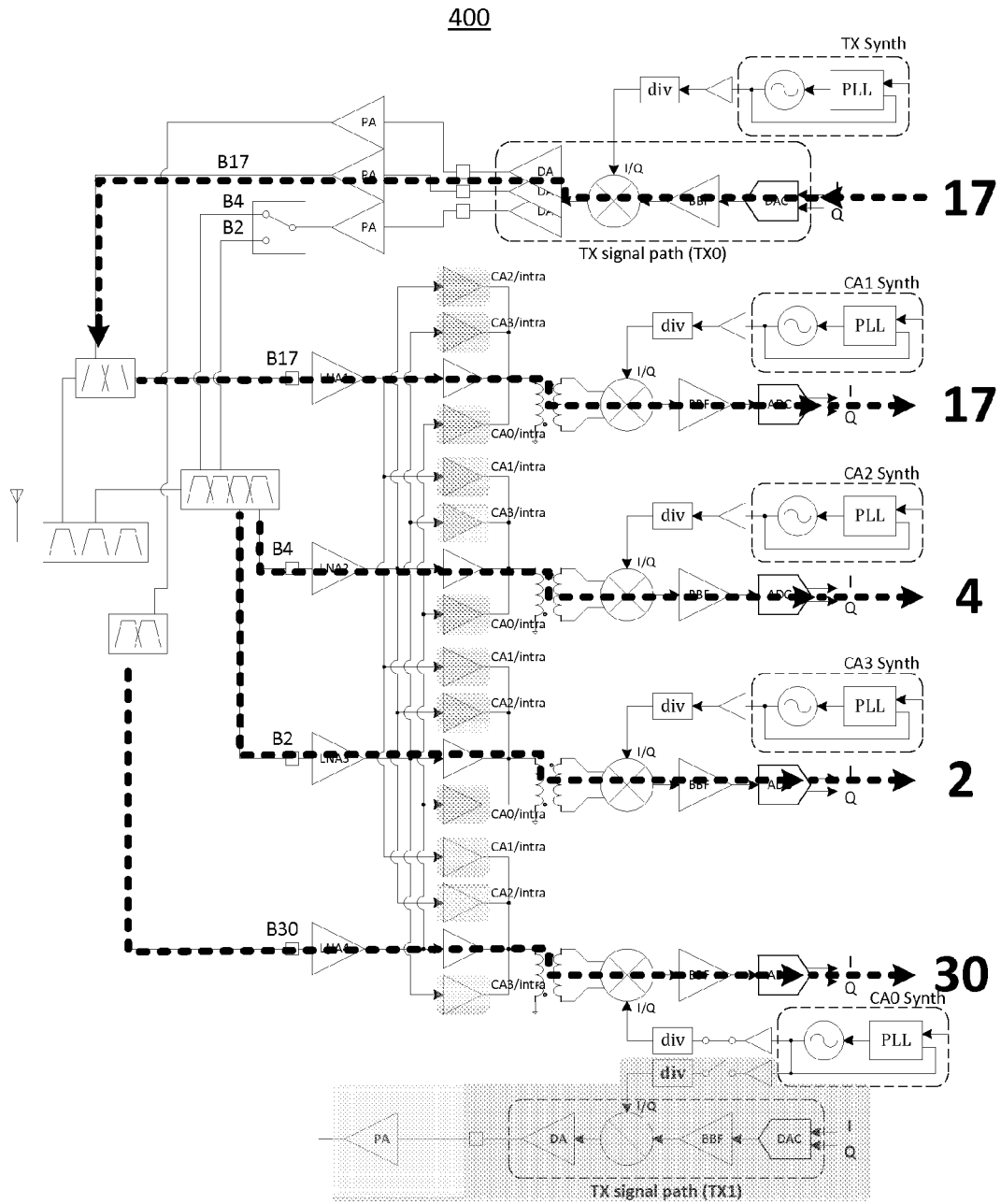
FIG. 4B illustrates signal paths for the RX and TX chains of an FDD CA transceiver shown in FIG. 4A.

FIG. 4B illustrates signal paths for the RX and TX chains of an FDD CA transceiver 400 shown in FIG. 4A. The top most chain is a TX chain for band 17 assigned to LTE FDD. The next chain down is an RX chain for band 17 assigned to LTE FDD. The next chain down is an RX chain for band 4 assigned to LTE FDD. The next chain down is an RX chain for band 2 assigned to LTE FDD. The next chain is an RX chain for band 30 assigned to LTE FDD.

Figure 5A:
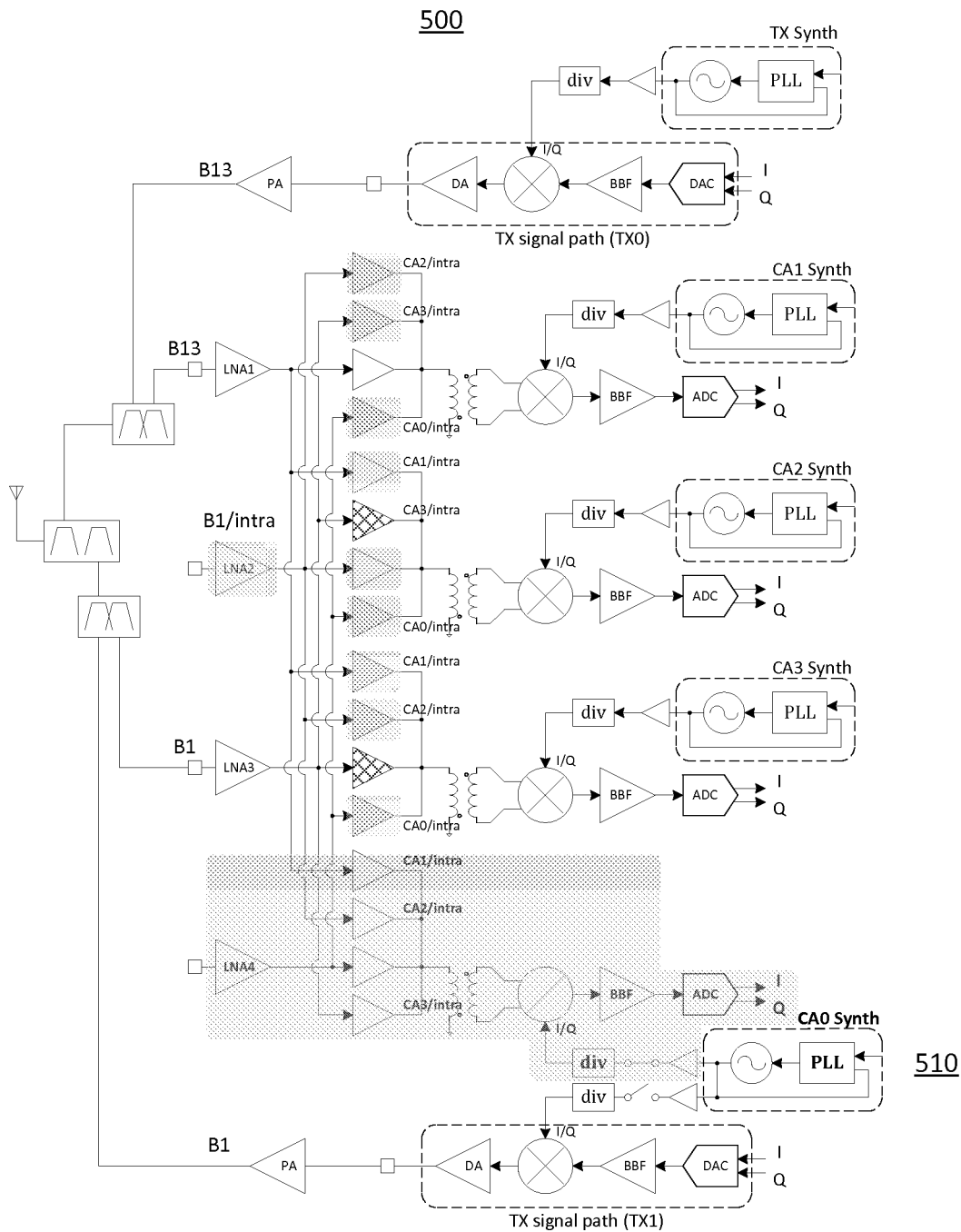
FIG. 5A illustrates another example case (LTE FDD(2DL/intra+1UL+1DL+1UL)) of a FDD CA transceiver designed using the method described in FIG. 1C.

FIG. 5A illustrates another example case (LTE FDD(2DL/intra+1UL+1DL+1UL)) of a FDD CA transceiver designed using the method described in FIG. 1C. Table 5 specifies the layout of the Rx and Tx chains for band combination B1+B13+B1/intra+B1/inter shown in FIG. 5A. Thus, FDD band 1 is assigned to TX1 so that CA0 synthesizer is separately used by the TX0 chain. The remaining chains (Rx/CA1, Rx/CA2, Rx/CA3, TX0) are all assigned to LTE FDD bands 1 and 13. Rx/CA0 chain is disabled because CA0 synthesizer is assigned to a Tx chain in LTE FDD. Since intra/non-contiguous CA is enabled, LNA2 for B1/intra is disabled (shaded) and LNA3 output of B1 is split out into two buffers (cross patterned) to share the output of LNA3 between Rx/CA2 and Rx/CA3.

TABLE 5

| R/T | Technology | Band |
|---|---|---|
| RX/CA1 | LTE FDD | B13 |
| RX/CA2 | LTE FDD | B1/intra |
| RX/CA3 | LTE FDD | B1 |
| RX/CA0 | NA | NA |
| TX0 | LTE FDD | B13 |
| TX1 | LTE FDD | B1 |

Figure 5B:
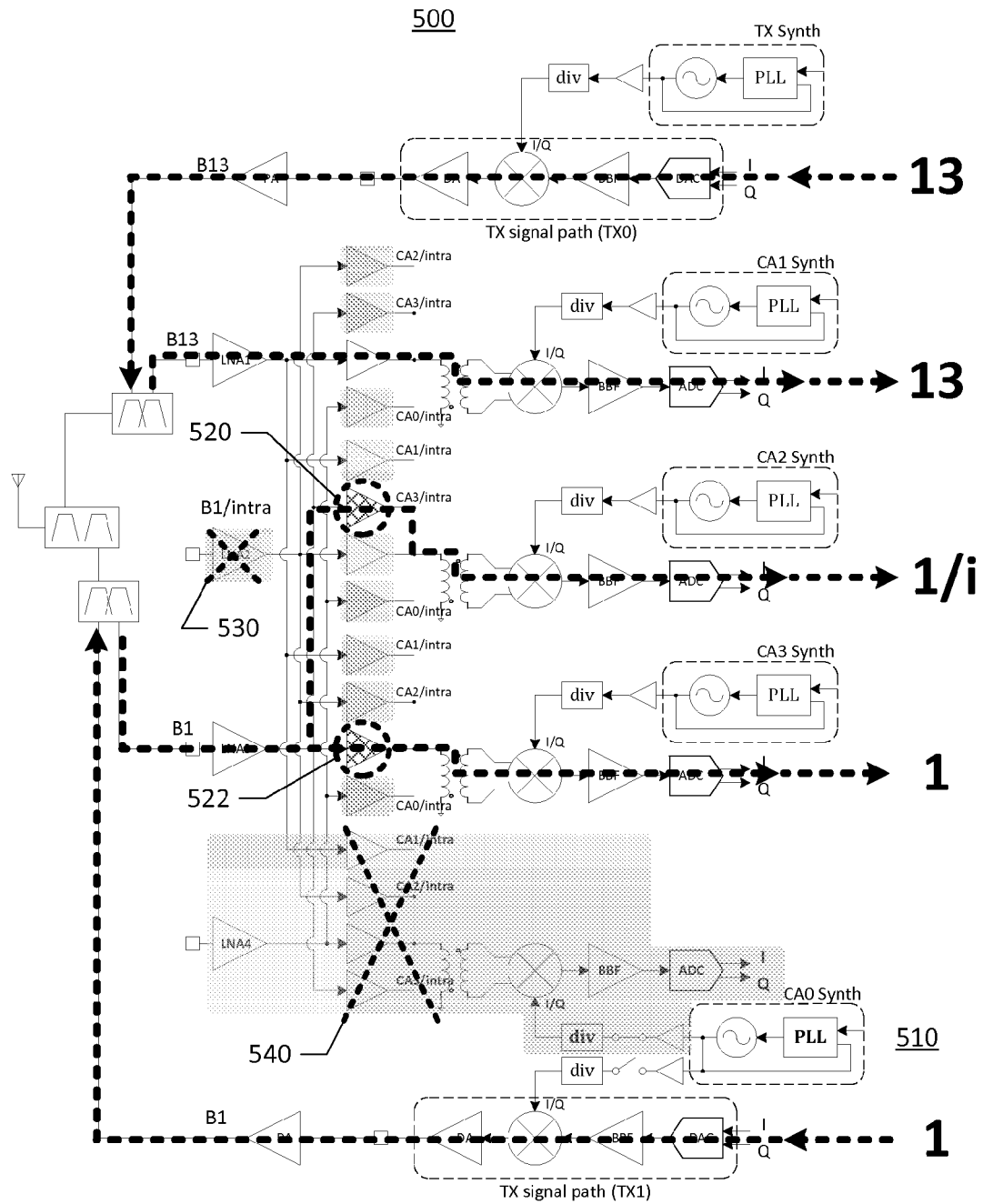
FIG. 5B illustrates signal paths for the Rx and Tx chains of an FDD CA transceiver shown in FIG. 5A.

FIG. 5B illustrates signal paths for the Rx and Tx chains of an FDD CA transceiver 500 shown in FIG. 5A. The top most chain is a TX chain for band 13 assigned to LTE FDD. The next chain down is an RX chain for band 13 assigned to LTE FDD. The next two chains are an RX chain for band 1/intra and another RX chain for band 1 assigned to LTE FDD. Since intra/non-contiguous CA is enabled, LNA2 for B1/intra is disabled (shaded) 530 and LNA3 output of B1 is split out into two buffers (cross patterned) 520, 522 to share the output of LNA3 for RX chains of band 1 and band 1/intra. The Rx/CA0 chain is disabled 540 because CA0 synthesizer 510 is assigned to a TX1 chain of LTE FDD band 1.

Figure 6A:
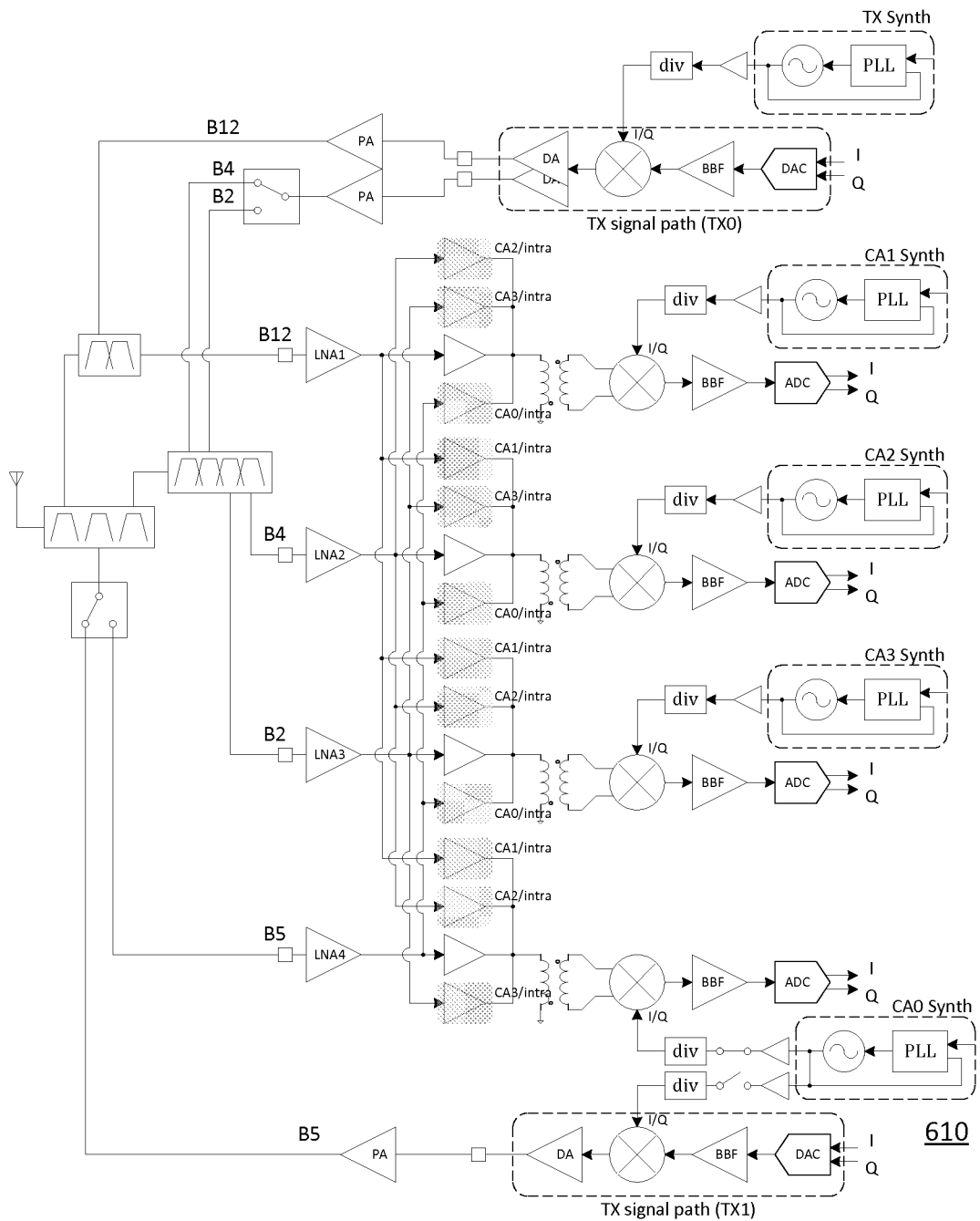
FIG. 6A illustrates another example case (LTE FDD (3DL+1UL)+GSM/TDD(1DL+1UL)) of an FDD/TDD/GSM CA transceiver designed using the method described in FIG. 1C.

FIG. 6A illustrates another example case (LTE FDD (3DL+1UL)+GSMiTDD(1DL+1UL)) of an FDD/TDD/GSM CA transceiver designed using the method described in FIG. 1C. Table 6 specifies the layout of the Rx and Tx chains for band combination B5+B12+B4+B2 shown in FIG. 6A. Thus, GSM/TDD band 5 is assigned to Rx/CA0 and TX1 so that CA0 synthesizer can be shared. The remaining chains (Rx/CA1. Rx/CA2, Rx/CA3, TX0) are assigned to LTE FDD band 12, 4 and 2. Since there are no intra-band links, all CA/intra buffers are disabled (shaded areas in FIG. 6A).

TABLE 6

| R/T | Technology | Band |
| --- | --- | --- |
| RX/CA1 | LTE FDD | B12 |
| RX/CA2 | LTE FDD | B4 |
| RX/CA3 | LTE FDD | B2 |
| RX/CA0 | GSM | B5 |
| TX0 | LTE FDD | B12 |
| TX1 | GSM | B5 |

Figure 6B:
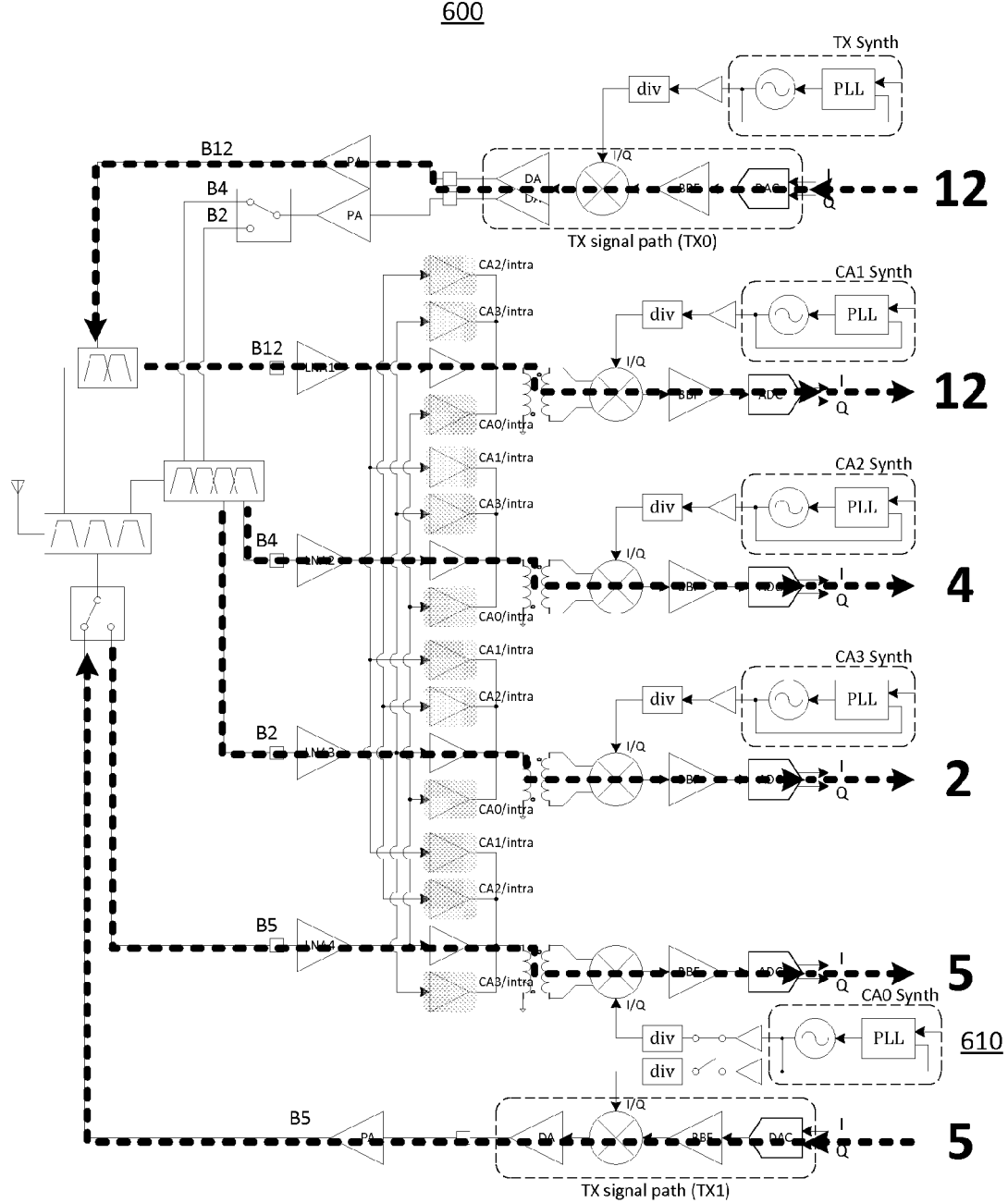
FIG. 6B illustrates signal paths for the Rx and Tx chains of an FDD/TDD/GSM CA transceiver shown in FIG. 6A.

FIG. 6B illustrates signal paths for the Rx and Tx chains of an FDD/TDD/GSM CA transceiver 600 shown in FIG. 6A. The top most chain is a TX chain for band 12 assigned to LTE FDD. The next chain down is an RX chain for band 12 assigned to LTE FDD. The next chain down is an RX chain for band 4 assigned to LTE FDD. The next chain down is an RX chain for band 2. The next two chains are an RX chain and a TX chain for band 5 which are sharing CA0 synthesizer 610.

Figure 7A:
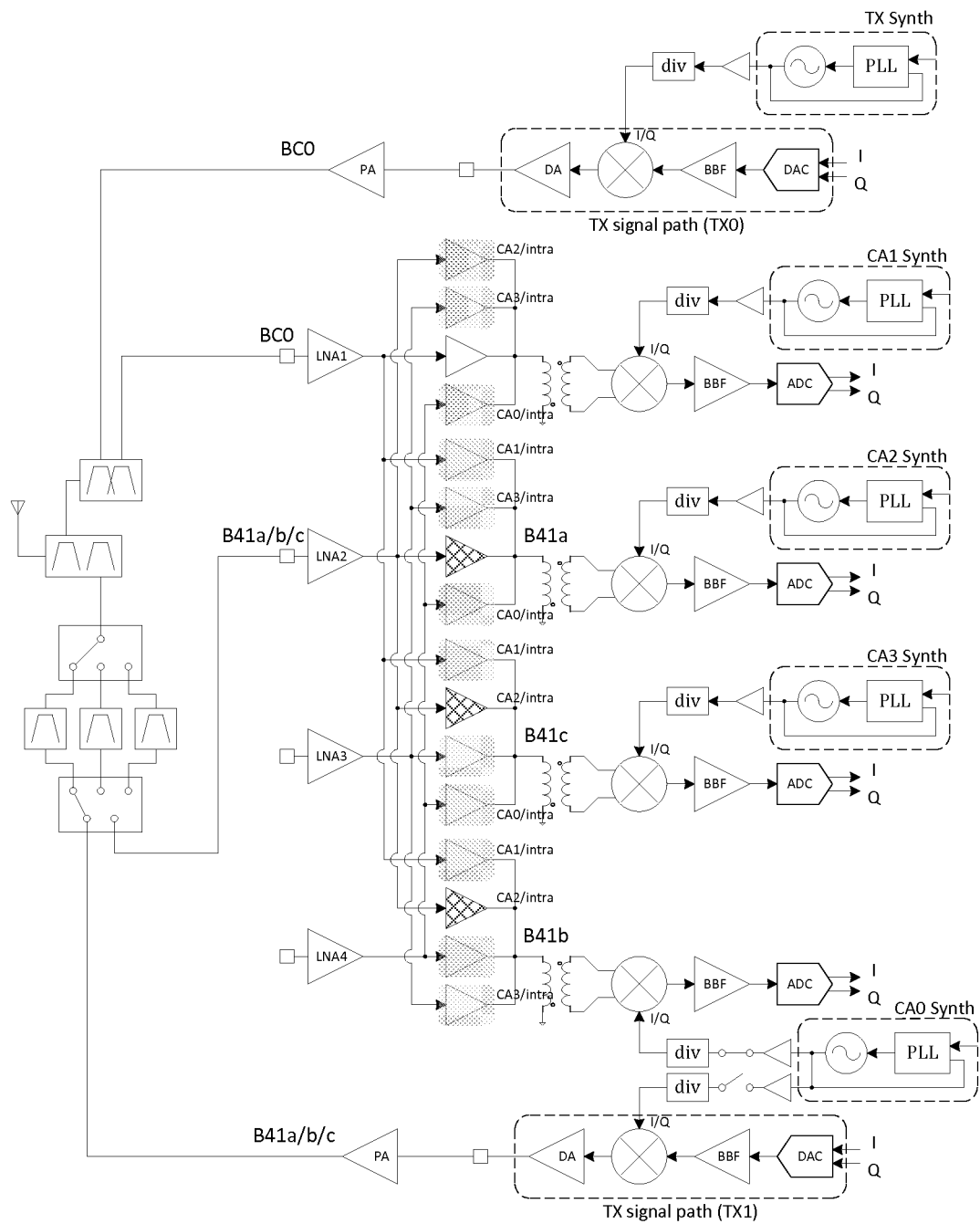
FIG. 7A illustrates another example case (SVLTE TDD (3DL+UL)+CDMA/FDD(1DL+1UL)) of an FDD/TDD/SVLTE CA transceiver designed using the method described in FIG. 1C.

FIG. 7A illustrates another example case (SVLTE TDD (3DL+1UL)+CDMA/FDD(1DL+1UL)) of an FDD/TDD/SVLTE CA transceiver designed using the method described in FIG. 1C. Term SVLTE stands for Simultaneous Voice Long Term Evolution (SVLTE). Table 7 specifies the layout of the Rx and Tx chains for band combination B41b+BC0+B41a+B41c shown in FIG. 7A. Thus, TDD band 41b is assigned to Rx/CA0 and TX1 so that CA0 synthesizer can be shared. The remaining chains are assigned as follows: Rx/CA1 and TX0 are assigned to CDMA BC0; and Rx/CA2, Rx/CA3 are assigned to LTE TDD band 41a and band 41c. In this case, chains Rx/CA2, Rx/CA3, Rx/CA0 use the same band 41 by using one-chip intra-LNA to simplify the front-end of the LTE TDD technology. Thus, LNA2 output of B41a is split out into three buffers (cross patterned) to share the output of LNA2 between Rx/CA2, Rx/CA3 and Rx/CA0.

TABLE 7

| R/T | Technology | Band |
| --- | --- | --- |
| RX/CA1 | CDMA | BC0 |
| RX/CA2 | LTE TDD | B41a |
| RX/CA3 | LTE TDD | B41c |
| RX/CA0 | LTE TDD | B41b |
| TX0 | CDMA | BC0 |
| TX1 | LTE TDD | B41b |

Figure 7B:
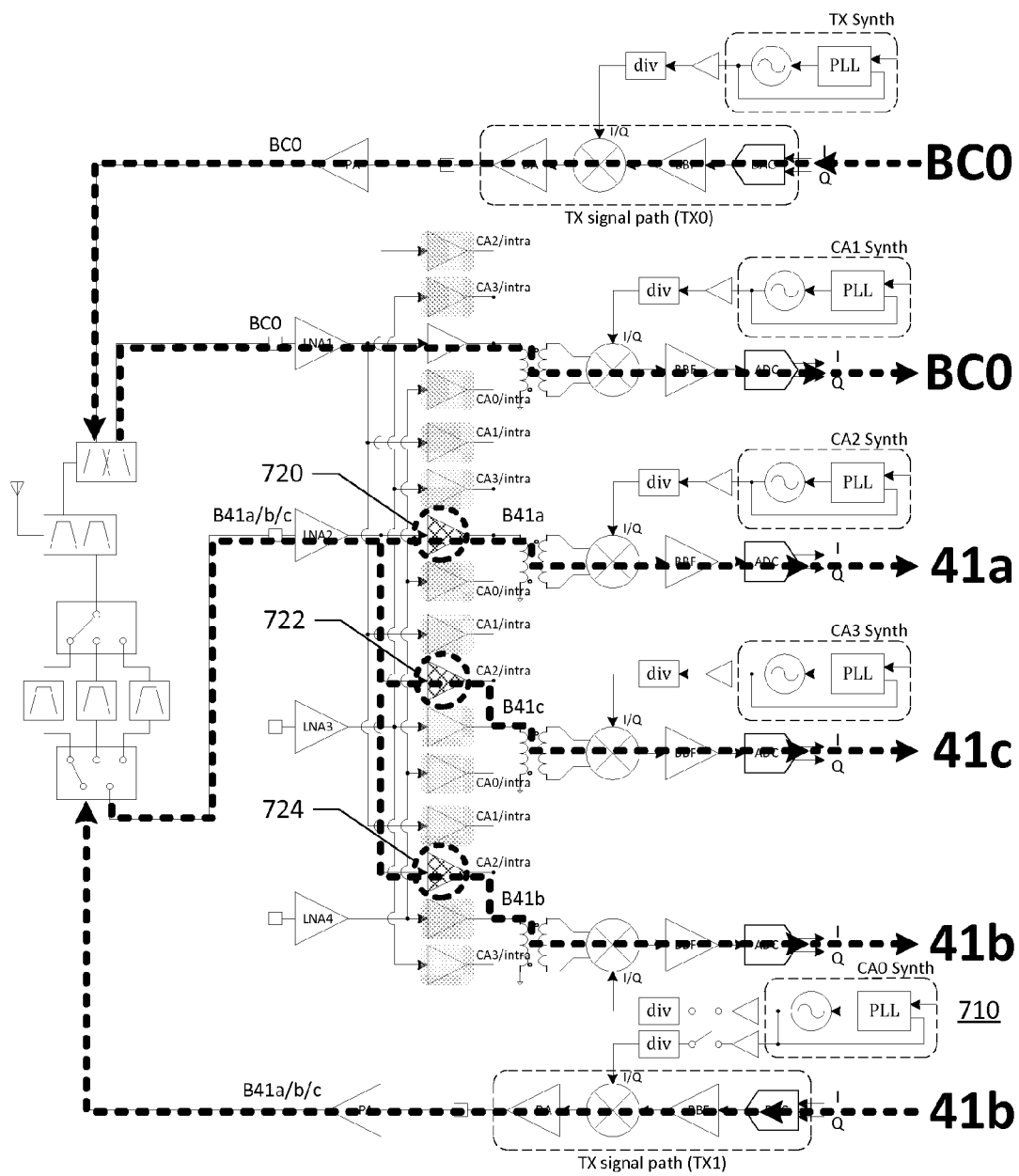
FIG. 7B illustrates signal paths for the Rx and Tx chains of an FDD/TDD/SVLTE CA transceiver shown in FIG. 7A.

FIG. 7B illustrates signal paths for the Rx and Tx chains of an FDD/TDD/SVLTE CA transceiver 700 shown in FIG. 7A. The top most chain is a TX chain for band BC0 assigned to CDMA. The next chain down is an RX chain for band BC0 assigned to CDMA. The next three chains are RX chains for bands 41a, 41c, 41b, respectively, assigned to LTE TDD. Since the three RX chains use the same band 41 by using one-chip intra-LNA to simplify the front-end of the LTE TDD technology, the LNA2 output of B41a is split out into three buffers (cross patterned) 720, 722, 724 to share the output of LNA2 between chains for bands 41a, 41c, 41b. The next chain is a TX chain for band 41b is sharing CA0 synthesizer 710 with the Rx chain 41b, which is split out of the LNA2 output.

Figure 8A:
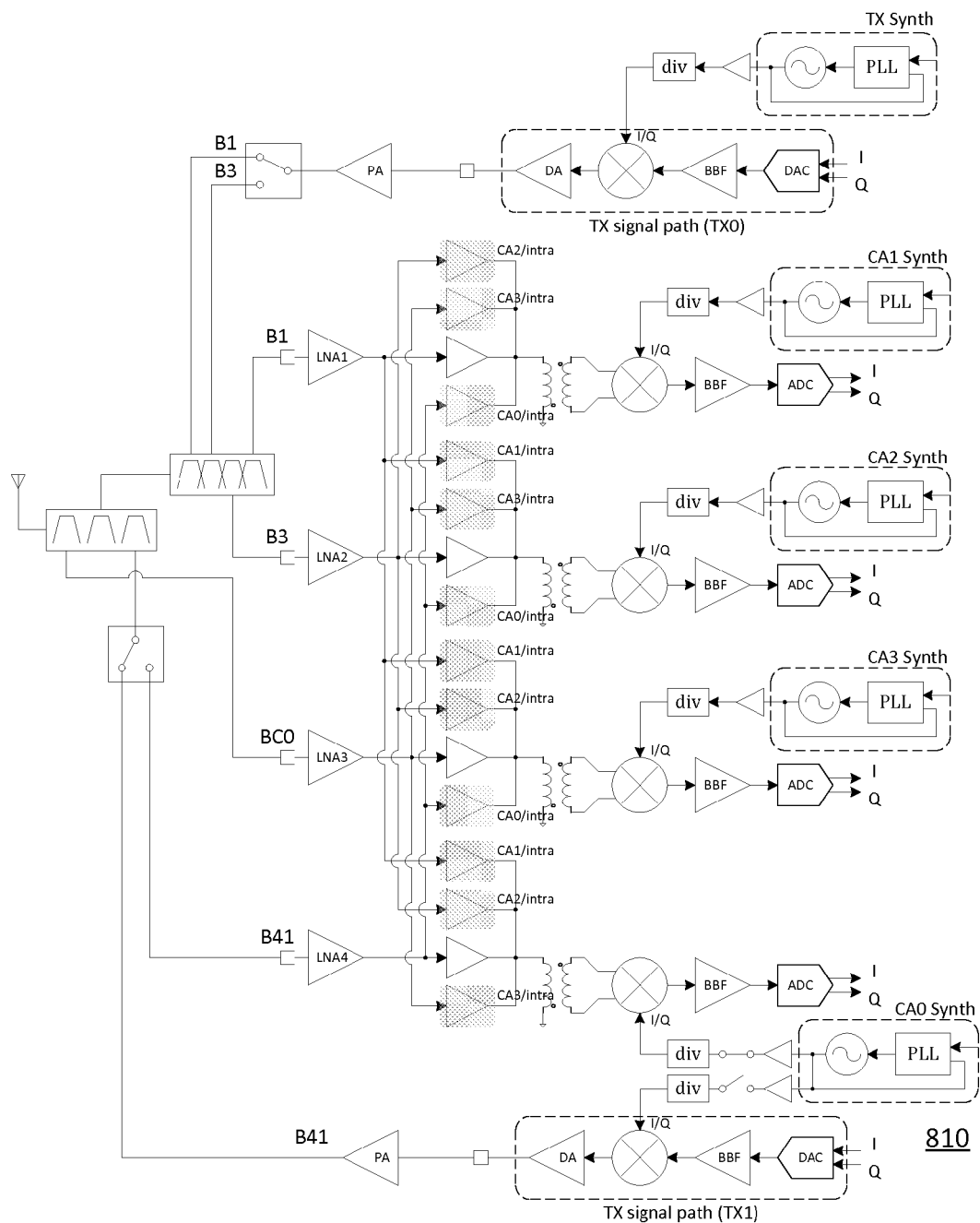
FIG. 8A illustrates another example case (SVLTE FDD (2DL+1UL)+LTE TDD(1DL+1UL)+CDMA(1DL)) of an FDD/TDD/SVLTE+DSDS CA transceiver designed using the method described in FIG. 1C.

FIG. 8A illustrates another example case (SVLTE FDD (2DL+1UL)+LTE TDD(1DL+1UL)+CDMA(1DL)) of an FDD/TDD/SVLTE+DSDS CA transceiver designed using the method described in FIG. 1C. Term DSDS stands for Dual SIM Dual Standby. Table 8 specifies the layout of the Rx and Tx chains for band combination B41+B1+B3+BC0 shown in FIG. 8A. Thus, TDD band 41 is assigned to Rx/CA0 and TX1 so that CA0 synthesizer can be shared. The remaining chains Rx/CA1, Rx/CA2, TX0 are assigned to LTE FDD band 1, 3 and Rx/CA3 is assigned to CDMA/DSDS BC0. Since there are no intra-band links, all CA/intra buffers are disabled (shaded areas in FIG. 8A).

TABLE 8

| R/T | Technology | Band |
| --- | --- | --- |
| RX/CA1 | LTE FDD | B1 |
| RX/CA2 | LTE FDD | B3 |
| RX/CA3 | CDMA/DSDS | BC0 |
| RX/CA0 | LTE TDD | B41 |
| TX0 | LTE FDD | B1 |
| TX1 | LTE TDD | B41 |

Figure 8B:
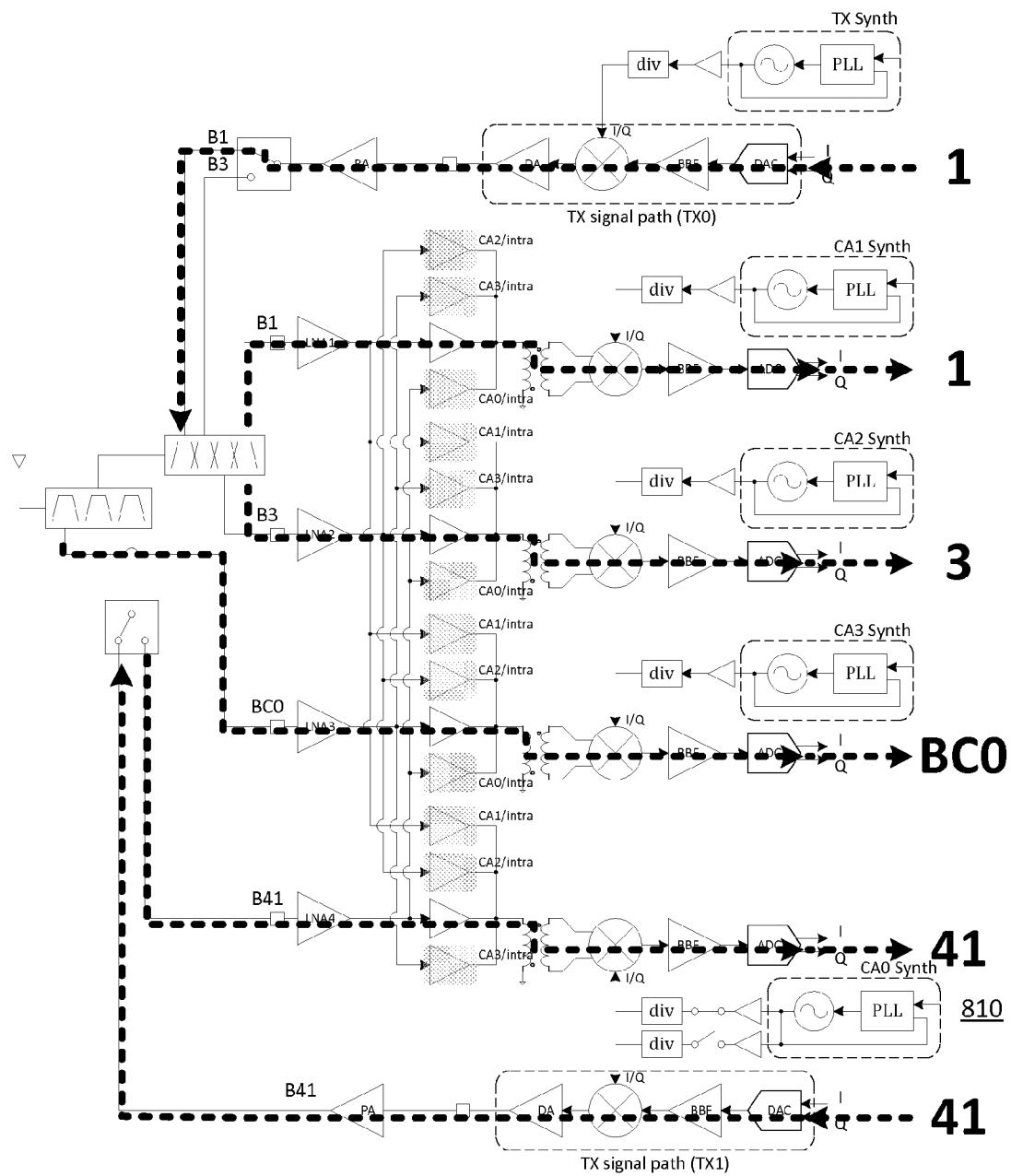
FIG. 8B illustrates signal paths for the Rx and Tx chains of an FDD/TDD/SVLTE+DSDS CA transceiver shown in FIG. 8A.

FIG. 8B illustrates signal paths for the Rx and Tx chains of an FDD/TDD/SVLTE+DSDS CA transceiver 800 shown in FIG. 8A. The top most chain is a TX chain for band 1 assigned to LTE FDD. The next chain down is an RX chain for band 1 assigned to LTE FDD. The next chain down is an RX chain for band 3 assigned to LTE FDD. The next chain down is an RX chain for band BC0 assigned to CDMA/DSDS. The next two chains are an RX chain and a TX chain for band 41 which are sharing CA0 synthesizer 810 and are assigned to LTE TDD.

Although several embodiments of the invention are described above, many variations of the invention are possible. Further, features of the various embodiments may be combined in combinations that differ from those described above. Moreover, for clear and brief description, many descriptions of the systems and methods have been simplified. Many descriptions use terminology and structures of specific standards. However, the disclosed systems and methods are more broadly applicable.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks, units, steps, components, and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Further, circuits implementing the embodiments and functional blocks and modules described herein can be realized using various transistor types, logic families, and design methodologies.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method for reconfiguring a transceiver design using a plurality of frequency synthesizers and a plurality of carrier aggregation (CA) receiver (Rx) and transmitter (Tx) chains, the method comprising:
   connecting a first frequency synthesizer to a first CA Tx chain,
   wherein the first frequency synthesizer is configured to be used for the first CA Tx chain in one of a frequency division duplex (FDD) mode or time division duplex (TDD) mode;
   connecting the plurality of frequency synthesizers to the plurality of CA Rx chains,
   wherein a second frequency synthesizer of the plurality of frequency synthesizers is connected as a shared synthesizer to a first CA Rx chain and a second CA Tx chain,
   wherein the shared synthesizer is configured to be used for one of the second CA Tx chain or the first CA Rx chain when the shared synthesizer is to drive a TDD chain or is in the FDD mode, and
   wherein remaining frequency synthesizers are configured to be used for remaining Rx chains in one of the FDD mode or the TDD mode.

2. The method of claim 1, wherein the transceiver includes at least: three CA Rx chains in the FDD mode; one CA Rx chain in TDD mode; one CA Tx chain in the FDD mode; and one CA Tx chain in the TDD mode.

3. The method of claim 1, wherein the transceiver includes at least: four CA Rx chains in the TDD mode; and two CA Tx chains in the TDD mode.

4. The method of claim 1, wherein the second CA Tx chain is disabled.

5. The method of claim 4, wherein the transceiver includes at least: four CA Rx chains in the FDD mode; and one CA Tx chain in the FDD mode.

6. The method of claim 1, wherein a second CA Rx chain is disabled.

7. The method of claim 6, wherein the transceiver includes at least: three CA Rx chains in the FDD mode; and two CA Tx chain in the FDD mode.

8. The method of claim 1, further comprising
   enabling intra-band/contiguous receive CA to use a same synthesizer frequency with extended receive baseband filter (BBF) bandwidth to increase the number of downlink channels.

9. The method of claim 1, further comprising
   enabling intra-band/contiguous transmit CA to use a same synthesizer frequency with extended transmit baseband filter (BBF) bandwidth to increase the number of uplink channels.

10. The method of claim 1, further comprising
    enabling intra-band/non-contiguous CA by splitting an output of a low noise amplifier (LNA).

11. A reconfigurable transceiver circuit, comprising:
    a first frequency synthesizer configured to connect to a first CA Tx chain,
    wherein the first frequency synthesizer is configured to be used for the first CA Tx chain in one of an FDD mode or TDD mode;
    a plurality of frequency synthesizers configured to connect to a plurality of CA Rx chains, wherein a second frequency synthesizer of the plurality of frequency synthesizers is connected as a shared synthesizer to a first CA Rx chain and a second CA Tx chain,
    wherein the shared synthesizer is configured to be used for one of the second CA Tx chain or the first CA Rx chain when the shared synthesizer is to drive a TDD chain or is in the FDD mode, and
    wherein remaining frequency synthesizers are configured to be used for remaining Rx chains in one of the FDD mode or the TDD mode.

12. The circuit of claim 11, wherein: two of the remaining frequency synthesizers are configured to be used for two of the remaining Rx chains in the TDD mode; and one of the remaining frequency synthesizer is configured to be used for one of the remaining Rx chain in the FDD mode.

13. The circuit of claim 11, wherein the second CA Tx chain is disabled.

14. The circuit of claim 11, wherein a second CA Rx chain is disabled.

15. The circuit of claim 11, further comprising
    intra-band/contiguous receive CA configured to use same synthesizer frequency with extended receive baseband filter (BBF) bandwidth to increase the number of downlink channels.

16. The circuit of claim 11, further comprising intra-band/contiguous transmit CA configured to use same synthesizer frequency with extended transmit baseband filter (BBF) bandwidth to increase the number of uplink channels.

17. The circuit of claim 11, further comprising intra-band/non-contiguous CA configured to be enabled by splitting an LNA output.

18. The circuit of claim 11, wherein the first frequency synthesizer, the first CA Tx chain, and the plurality of frequency synthesizers are disposed on a single-chip.

* * * * *